Sept. 29, 1959  J. D. YOUNG  2,907,015
PLANTER INDICATOR
Filed April 15, 1957  2 Sheets-Sheet 1

INVENTOR.
JOHN D. YOUNG
BY Alexander Riaboff
ATTORNEY

Sept. 29, 1959

J. D. YOUNG 2,907,015

PLANTER INDICATOR

Filed April 15, 1957

INVENTOR.
JOHN D. YOUNG
BY Alexander Riaboff
ATTORNEY

United States Patent Office 2,907,015
Patented Sept. 29, 1959

2,907,015

PLANTER INDICATOR

John D. Young, Fresno, Calif.

Application April 15, 1957, Serial No. 652,996

2 Claims. (Cl. 340—239)

This invention relates to a planter indicator.

Generally a modern planter comprises a box containing seeds which are discharged to the ground through a plurality of tubes, or shoots, extending from said box downwardly and terminating in close vicinity to the ground. While the planter is slowly moved along a field, seeds pass from the box through the shoots. Sometimes one or more of the shoots become jammed at the planter box or the shoots become clogged with dirt at the lower end of the shoot. In either case such shoots cease to operate and the rows thereunder remain unseeded. There is presently no device indicating whether a shoot is discharging seeds or not, and the planter operator has to stop the planter and inspect it once in a while to see that all the shoots are properly functioning. The failure of a shoot, or shoots, to function forces the operator to replant the unseeded area which results in loss of time and seeds.

The primary object of this invention is to provide an individual seed discharge indicator for each shoot which indicates by light signals whether a shoot functions properly, whether the same is clogged at the lower end or whether the shoot became jammed at the planter box.

Another object of this invention is to provide a device which is simple in design, cheap to manufacture and efficient for the purpose intended.

Other objects and advantages will appear as the specification proceeds and the novel features of the device will be particularly pointed out in the claims hereto attached.

In this specification and the annexed drawing the invention is illustrated in the form considered to be the best, but it is understood that the invention is not limited to such form; and it is also to be understood that in and by the claims following the description, it is desired to cover the invention in whatsoever form it may be embodied.

This invention is illustrated by drawings forming a part of this specification, in which.

Figure 1:
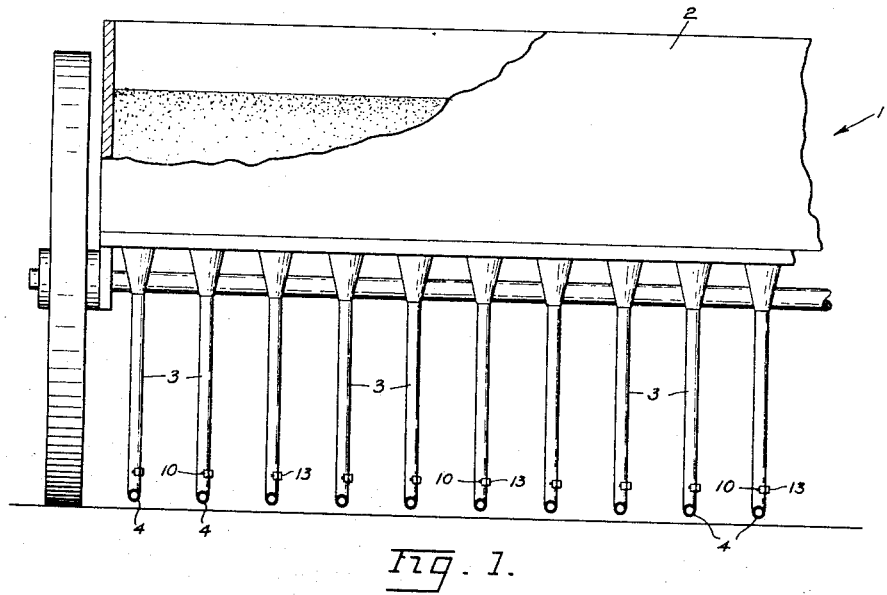
Fig. 1 is a partial rear elevation of a planter.
Figure 2:
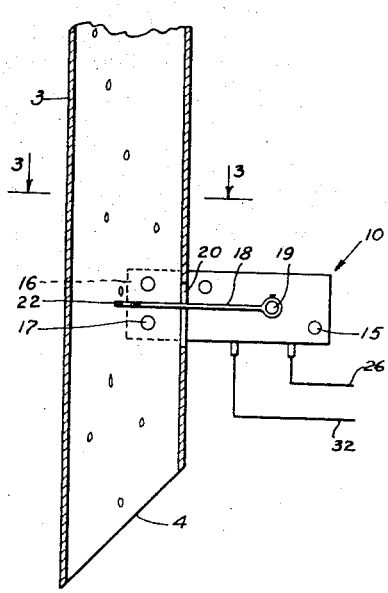
Fig. 2 is a vertical cross-section through one of the planter shoots showing the device attached thereto.
Figure 3:
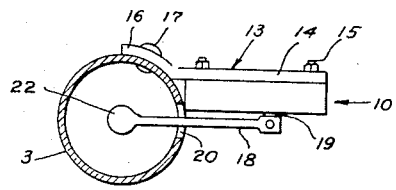
Fig. 3 is a horizontal cross-section of the planter shoot taken along the line 3–3 of Fig. 2.
Figure 4:
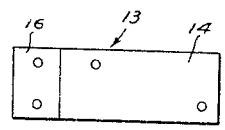
Fig. 4 is a side view of a bracket by which the device is attached to the shoot.

My device is used in connection with a planter, generally shown in the drawings at 1 and having a seed box 2 from which the seeds are discharged to the ground through a plurality of tubes or shoots 3, while the planter is advanced in a field.

Each shoot 3 carries a micro-switch 10 secured to said shoot on the rearside thereof about three inches above the upper end of the bevel 4. The micro-switch 10 may be of any standard make or design, but must be sufficiently sensitive to be operated by individual grains of seed falling through said shoot. The micro-switches 10 are secured to respective shoots 3 by means of mounting plates 13. Each of the latter consists of a straight portion 14 to which said micro-switch 10 is attached by means of bolts 15, and a curved portion 16 which fits the curvature of the shoot 3 and to which it is attached by rivets 17.

The micro-switch 10 is provided with an arm 18, one end of which is secured to a shaft 19 extending into the switch, and the other, free end, extends into the shoot 3 through an opening 20 therein. The free end of said arm 18 terminates with a spoon 22 located substantially equidistant from the wall of the shoot 3 and in the path of seeds falling through said shoot.

Figure 7:
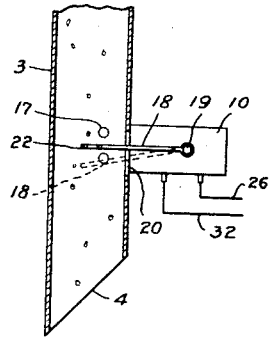

Seeds falling through the shoot 3 strike the spoon 22 and the arm 18 and force the latter downwardly momentarily, as shown in Fig. 7 in dotted lines. Swinging of the arm 18 downwardly rocks the shaft 19, which in turn closes and opens contact points in the switch, not shown in the drawing.

One pole of the switch 10 is electrically connected by a wire 26 with a small light globe 27, such as a pilot light or a red jewel light. The latter light is connected by a wire 28 to a wire 30 leading to a battery 31, or other source of electric current. A wire 32 connects the other pole of said switch 10 to a wire 34, which is also connected to said battery 31. Preferably another small light globe 35 is connected, parallel to the light globe 27, by wires 36 and 37 to the wires 26 and 30 respectively.

Seeds striking the spoon 22 and the arm 18 force said arm downwardly, thus momentarily closing the micro-switch 10, and causing both light globes 27 and 35 to flicker. If one light globe should for some reason burn out or cease to function, the other will continue to give signals to the planter operator.

Figure 5:
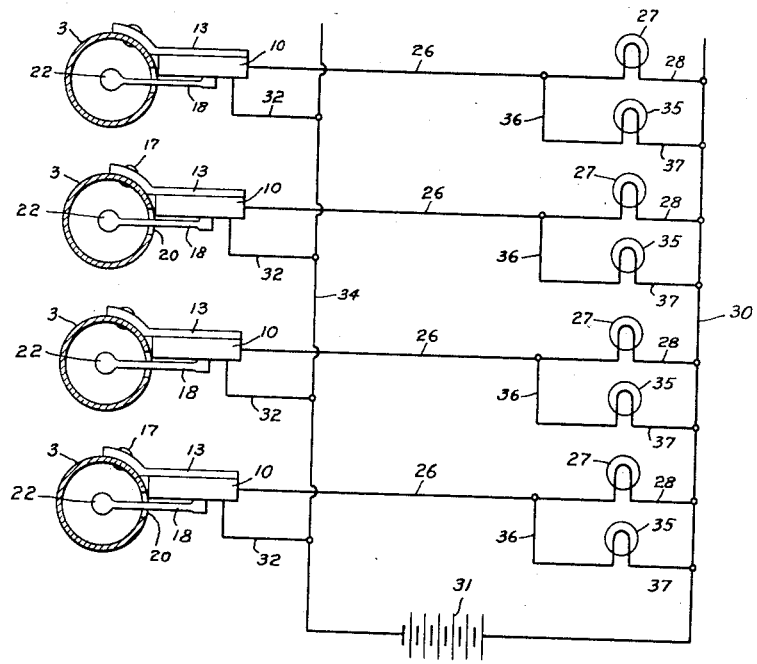
Fig. 5 is a wiring diagram of the device showing four shoots only.

The wiring diagram in Fig. 5 shows only four micro-switches 10, though actually there should be a separate micro-switch 3 and a pair of light globes 27 and 35 for each shoot 3. The light globes 27 and 35 are arranged on a dashboard of the tractor pulling the planter, or in some other place where it may easily be observed by the operator. By watching the lights go on and off the operator keeps constant control over said shoots 3 and is enabled to judge which of the shoots are working normally.

Figure 6:
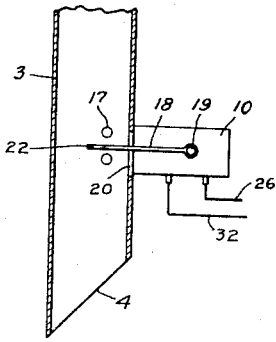
Fig. 6, Fig. 7 and Fig. 8 illustrate the position of the switch arm when the shoot is jammed at the box, when the shoot operates normally, and when the shoot is clogged at the end.

If a shoot 3 becomes jammed at the planter box 2, seeds stop falling through said shoot and thus no seed strikes the spoon 22, or arm 18 of the micro-switch 10, as shown in Fig. 6. Consequently there is no flickering light in the respective light globes 27 and 35. Hence, if the operator observes that certain light globes stop flickering, he must check up the respective shoot 3 at the seed box 2.

Figure 8:
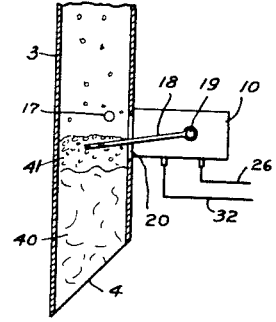

It may also happen that the lower end of a shoot 3 will get clogged with dirt, as shown at 40 in Fig. 8. Thereupon the falling seeds shall bury the spoon 22. The arm 18 will be forced downwardly by the weight of seeds 41 piled up on the dirt 40, thus closing the micro-switch 10. Therefore the respective light globes 27 and 35 will emit steady light instead of flickering. Steady light in globes 27 and 35 will indicate to the operator that the respective shoots 3 became clogged at the bottom.

The position of the switch 10 on the shoot 3 is so selected that the clogging of the lower end of said shoot is detected in a short time, yet the switch 10 is placed far enough from the end 4 of the shoot 3 to prevent possible damage to the arm 18 from pieces of dirt which may accidentally be thrown upwardly.

I claim:

1. The combination with a planter having a seed box and a plurality of planter shoots extending from said box downwardly for passing seeds from said box to the ground, of a planter indicator for each shoot for indicating the passage of seeds through said shoot, said indicator comprising a micro-switch secured to said shoot in close vicinity to the lower end thereof, said micro-switch having an arm extending therefrom into said shoot in the path of falling seeds, said micro-switch being adapted to be turned on and off by seeds striking said arm, a light globe electrically connected to said micro-switch, said light remaining unlit when no seeds are passing through said shoot, emitting flickering light when the seeds are passing through said shoot, the intensity of the flickering light being in proportion to the amount of the seed passing therethrough, and emitting a steady light when the shoot becomes clogged at its discharge end.

2. The combination with a planter having a seed box and a plurality of planter shoots, each extending from said box downwardly and terminating with a discharge end in close vicinity to the ground for passing seeds from said box to the ground, of a planter indicator for each shoot for indicating the passage of seeds therethrough, the stoppage of flow of seeds therethrough and the clogging of the end of said shoot by dirt from the ground, said indicator comprising a micro-switch secured to said shoot in close vicinity to the lower end thereof, said micro-switch having an arm extending therefrom into said shoot and terminating with a spoon located equidistantly from the wall of said shoot and in the path of the seeds falling through said shoot, said micro-switch and arm, being sufficiently sensitive to be actuated by a single falling seed to turn said micro-switch on whereupon said seed falls off said spoon, a signal device electrically connected to said micro-switch to indicate each actuation of said micro-switch by said arm, the frequency of said actuations being in proportion to the amount of seeds passing through said shoot, said signal device remaining inactive when no seeds are passing through said shoot, and said signal device emitting a steady signal when the discharge end of said shoot becomes clogged with dirt and seed to the level above said arm and thereby forces the arm down, and renders the same immobile.

References Cited in the file of this patent

UNITED STATES PATENTS

| 410,270 | Donner | Sept. 3, 1889 |
| 410,502 | Donner | Sept. 3, 1889 |

FOREIGN PATENTS

| 426,462 | Germany | Mar. 11, 1926 |
| 461,072 | Germany | June 12, 1928 |